(12) United States Patent
DeLorme et al.

(10) Patent No.: US 8,667,035 B2
(45) Date of Patent: Mar. 4, 2014

(54) METHOD OF CONVERTING A FILESYSTEM WHILE THE FILESYSTEM REMAINS IN AN ACTIVE STATE

(75) Inventors: Dennis Steven DeLorme, Rochester, MN (US); Margaret Rose Fenlon, Rochester, MN (US); Robert Thaddeus Gintowt, Rochester, MN (US); Alan Leon Levering, Rochester, MN (US); Thomas Marcus McBride, Mantorville, MN (US); Michael John Oberholtzer, Stewartville, MN (US); Jeffrey John Parker, Rochester, MN (US); Richard Michael Theis, Rochester, MN (US); Jerry Leroy Von Berge, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 1839 days.

(21) Appl. No.: 10/777,869

(22) Filed: Feb. 12, 2004

(65) Prior Publication Data
US 2005/0192974 A1 Sep. 1, 2005

(51) Int. Cl.
*G06F 7/00* (2006.01)
*G06F 17/00* (2006.01)

(52) U.S. Cl.
USPC ........... 707/828; 707/822; 707/821; 707/609; 707/705

(58) Field of Classification Search
USPC ............ 703/26; 707/1, 7, 101, 200, 201, 203, 707/205; 714/47
See application file for complete search history.

(56) References Cited

U.S. PATENT DOCUMENTS

| | | | | |
|---|---|---|---|---|
| 5,625,804 A | * | 4/1997 | Cooper et al. | 703/26 |
| 5,873,097 A | * | 2/1999 | Harris et al. | 707/203 |
| 5,983,240 A | * | 11/1999 | Shoroff et al. | 1/1 |
| 6,185,580 B1 | | 2/2001 | Day, III et al. | |
| 6,260,043 B1 | * | 7/2001 | Puri et al. | 707/101 |
| 6,338,072 B1 | * | 1/2002 | Durand et al. | 707/205 |
| 6,571,231 B2 | * | 5/2003 | Sedlar | 707/1 |
| 6,671,701 B1 | * | 12/2003 | Chouinard | 707/201 |
| 6,728,907 B1 | * | 4/2004 | Wang et al. | 714/47 |
| 6,785,693 B2 | | 8/2004 | DeLorme et al. | |
| 6,944,620 B2 | | 9/2005 | Cleraux et al. | |
| 7,047,257 B2 | | 5/2006 | Fletcher et al. | |
| 7,072,913 B2 | | 7/2006 | Jans et al. | |

(Continued)

FOREIGN PATENT DOCUMENTS

EP 0 738 980 A2 10/1996

OTHER PUBLICATIONS

West, Jackson et al, "Sams Teach Yourself Macromedia Fireworks MX in 24 Hours," published by SAMS on Dec. 4, 2002.*

(Continued)

*Primary Examiner* — Paul Kim
(74) *Attorney, Agent, or Firm* — Wood, Herron & Evans LLP

(57) ABSTRACT

A filesystem conversion process converts a filesystem from one implementation type to another type while the filesystem remains active and fully accessible. The conversion process builds a list of directories in the filesystem that are of the old filesystem type and then converts each directory until the entire filesystem is converted. Instead of the filesystem being shutdown to perform the conversion, the conversion process may run as a background thread that does not interfere with normal filesystem operations.

28 Claims, 7 Drawing Sheets

(56) References Cited

U.S. PATENT DOCUMENTS

| | | | |
|---|---|---|---|
| 7,984,088 | B2 | 7/2011 | DeLorme et al. |
| 2002/0188625 | A1 | 12/2002 | Jans et al. |
| 2003/0037302 | A1* | 2/2003 | Dzienis .................. 715/523 |
| 2003/0217057 | A1* | 11/2003 | Kuroiwa et al. ............. 707/7 |
| 2005/0192918 | A1 | 9/2005 | DeLorme et al. |
| 2008/0059399 | A1 | 3/2008 | DeLorme et al. |

OTHER PUBLICATIONS

Dubinski, John, "Non-recursive tree walks," published on May 1, 1996.*
Patent Application entitled "Method for Supporting Multiple Filesystem Implementations," Dennis S. DeLorme et al., filed Feb. 12, 2004.
"Data Structures", Jan. 31, 1987, pp. 125-127.
U.S. Patent and Trademark Office, Restriction issued in related U.S. Appl. No. 10/777,870, dated Aug. 21, 2006.
U.S. Patent and Trademark Office, Office Action issued in related U.S. Appl. No. 10/777,870, dated Oct. 18, 2006.
U.S. Patent and Trademark Office, Final Office Action issued in related U.S. Appl. No. 10/777,870, dated Mar. 27, 2007.
U.S. Patent and Trademark Office, Office Action issued in related U.S. Appl. No. 10/777,870, dated Sep. 19, 2007.
U.S. Patent and Trademark Office, Final Office Action issued in related U.S. Appl. No. 10/777,870, dated Apr. 11, 2008.
U.S. Patent and Trademark Office, Final Office Action issued in related U.S. Appl. No. 10/777,870, dated Apr. 17, 2008.
U.S. Patent and Trademark Office, Office Action issued in related U.S. Appl. No. 10/777,870, dated Aug. 14, 2008.
U.S. Patent and Trademark Office, Final Office Action issued in related U.S. Appl. No. 10/777,870, dated Feb. 6, 2009.
U.S. Patent and Trademark Office, Advisory Action issued in related U.S. Appl. No. 10/777,870, dated Apr. 16, 2009.
U.S. Patent and Trademark Office, Office Action issued in related U.S. Appl. No. 10/777,870, dated Jul. 22, 2009.
U.S. Patent and Trademark Office, Final Office Action issued in related U.S. Appl. No. 10/777,870, dated Jan. 15, 2010.
U.S. Patent and Trademark Office, Examiner's Answer issued in related U.S. Appl. No. 10/777,870, dated Oct. 28, 2010.
U.S. Patent and Trademark Office, Office Action issued in related U.S. Appl. No. 11/927,116, dated Jun. 25, 2010.
U.S. Patent and Trademark Office, Final Office Action issued in related U.S. Appl. No. 11/927,116, dated Dec. 7, 2010.
U.S. Patent and Trademark Office, Notice of Allowance issued in related U.S. Appl. No. 11/927,116, dated Mar. 4, 2011.
U.S. Patent and Trademark Office, Supplemental Notice of Allowance issued in related U.S. Appl. No. 11/927,116, dated Apr. 1, 2011.

* cited by examiner

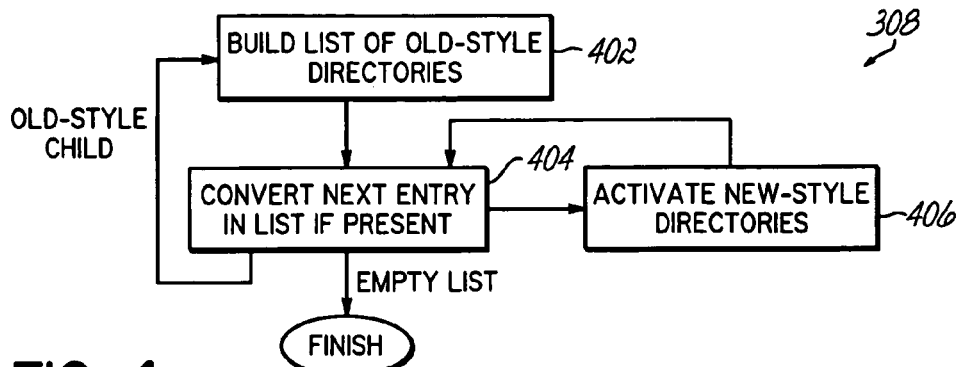
FIG. 4
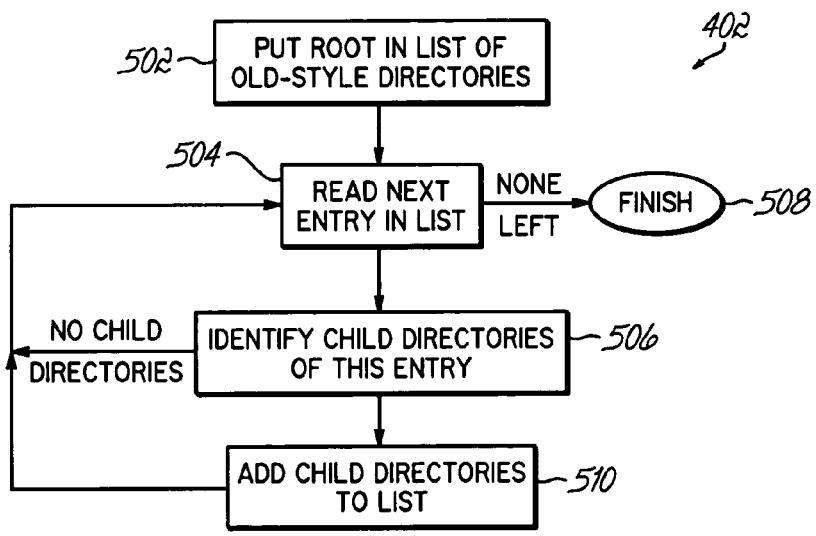
FIG. 5
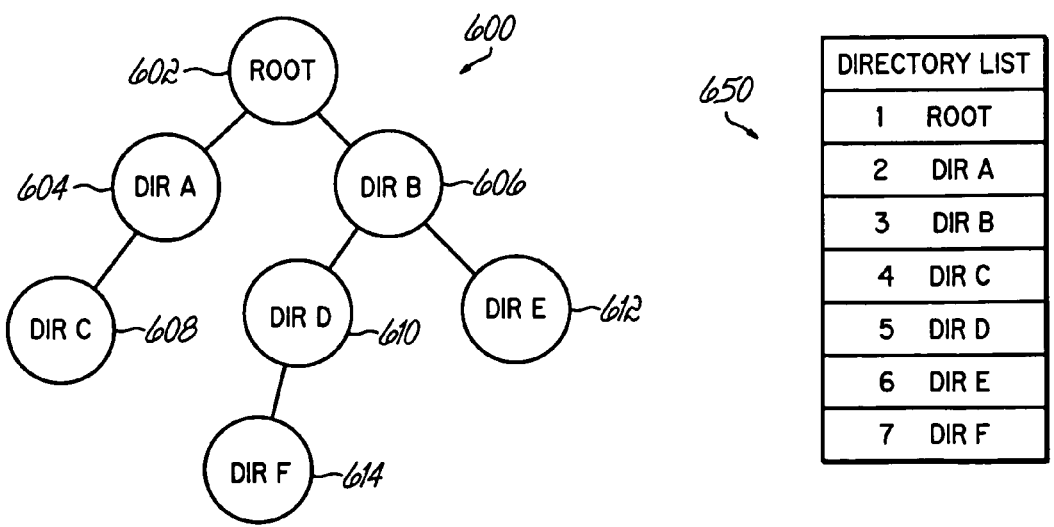
FIG. 6A
FIG. 6B

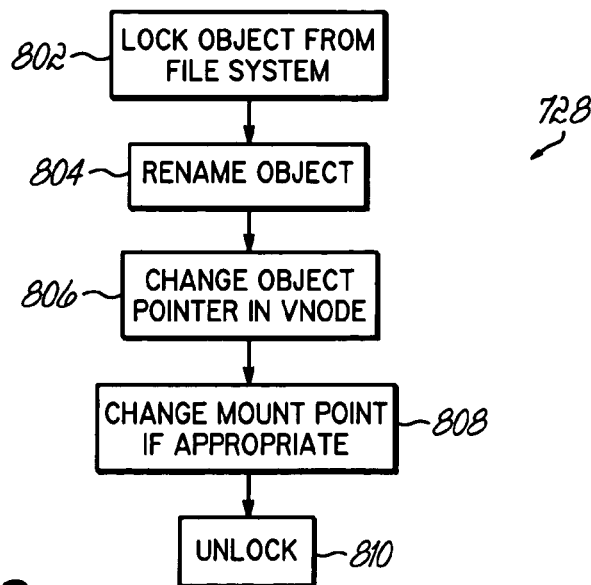
FIG. 8
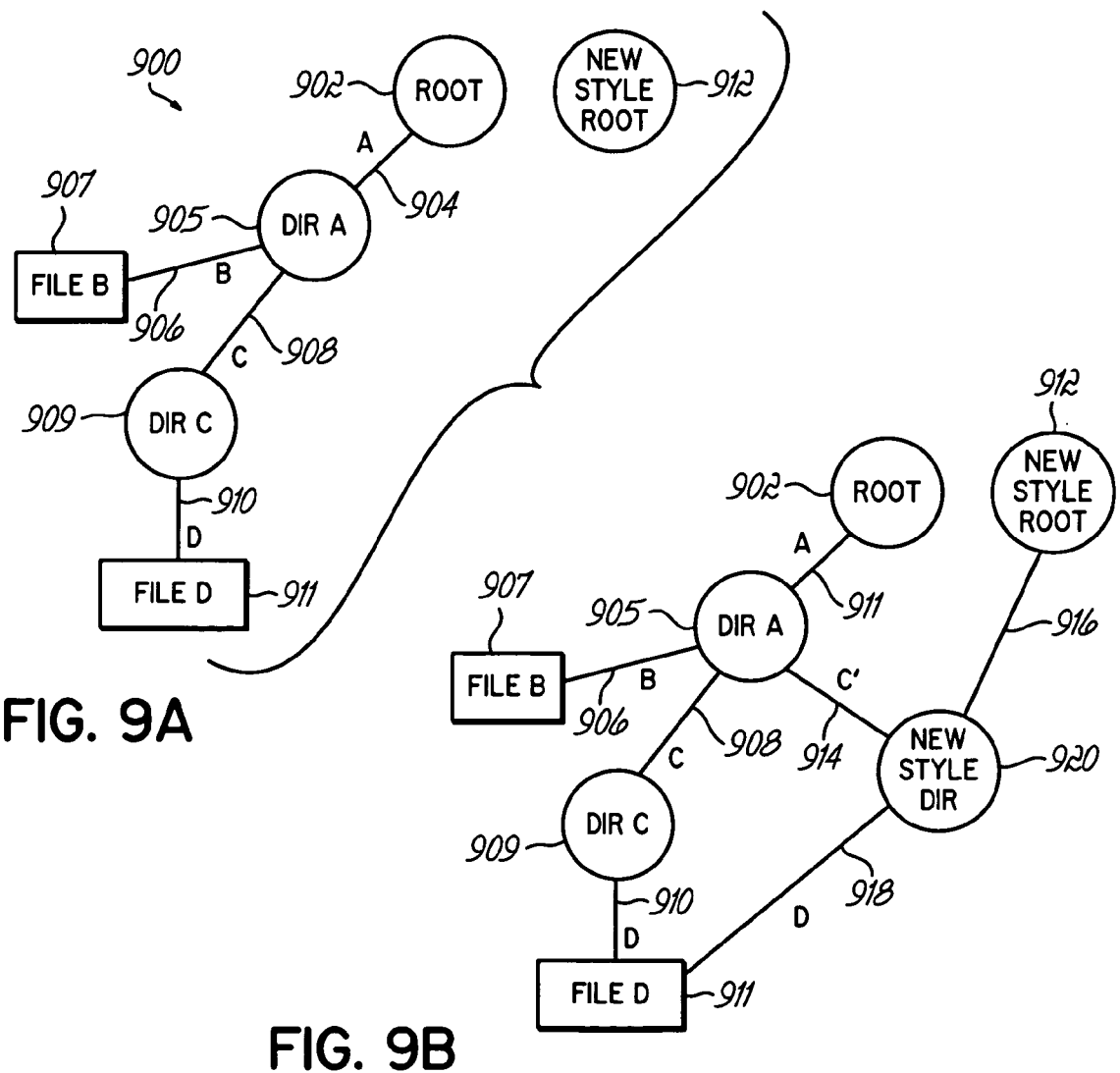
FIG. 9A
FIG. 9B

METHOD OF CONVERTING A FILESYSTEM WHILE THE FILESYSTEM REMAINS IN AN ACTIVE STATE

RELATED APPLICATIONS

This application is related to U.S. patent application Ser. No. 10/777,870 filed on Feb. 12, 2004 by Dennis Steven DeLorme et al. entitled METHOD FOR SUPPORTING MULTIPLE FILESYSTEM IMPLEMENTATIONS which is incorporated herein by reference in its entirety.

FIELD OF THE INVENTION

The present invention relates to computer filesystems and, more particularly, to converting from one filesystem type to another.

BACKGROUND OF THE INVENTION

As computers and affiliated storage capabilities progress, the underlying filesystem structure can play a role in an operating system's performance and reliability. In general, a file system includes a number of objects, such as files, that are stored on a computer system along with the metadata that relates to the arrangement and location of these files. Within UNIX-variant systems, the filesystem is often viewed as a hierarchical arrangement of directories and files stemming from a root directory. Such an arrangement is often viewed as an inverted tree where directories, sub-directories and files extend downward from the root directory ultimately to leaf-nodes. Within modern graphical user interface based operating systems, the filesystem is often viewed as an arrangement of folders that may or may not be hierarchically arranged.

The actual internal structure of the filesystem and its implementation is usually hidden from the user of the computer system. For example, early UNIX filesystems included a directory structure that resembled a table having matched pairs of names and inode numbers. The inode numbers themselves, pointed to a respective entry in an inode table that allowed the operating system to find and retrieve the file from a physical storage medium. Thus, the files and directories were not actually arranged hierarchically on the physical medium where they were stored; but, instead, the filesystem structure provided that appearance to the user. In general then, a directory is viewed as a table of entries with each entry including an object name and an "anchor" point. By accessing the anchor point, an operating system can locate an object referred to in a directory entry.

As operating systems and filesystems have developed and changed, a need has arisen for customers to be able to change filesystem structures (i.e., change from one type of filesystem to another type) to receive the benefits of that development. For example, over the course of development in one popular operating system, the filesystem type has changed from FAT16, to FAT32 and to NTFS. While it is possible to require customers to completely re-install all their software and files when a new filesystem type is introduced, doing so would have a number of drawbacks. The cost, time and complexity of such an undertaking would cause many customers to avoid the upgrade process even though it might be beneficial.

Accordingly, automatic methods have been developed for updating filesystems from one type to another to make the conversion process easier for customers. Each different operating system has its own filesystem conversion process that has been developed. For example, HP-UX, Solaris, AS/400, and Windows, each supported a particular filesystem and directory structure that, when updated, required a specific conversion program to update the filesystem type or structure. In the past, all of these different filesystem conversion processes have had a significant drawback, they have required the user to shutdown the filesystem while upgrading the filesystem. Thus, when converting a filesystem, a user is unable to perform other operations with the affected computer system which leads to operational downtime and often increased costs.

One alternative way to convert filesystems is known as "first-touch" conversion. This method of filesystem conversion avoids shutting down the entire filesystem as described above, but introduces its own set of problems. In a first-touch process, the operating system recognizes when a file object is "touched" for the first time after a new filesystem type is available. The operating system then stops its processing and converts the filesystem object to the new filesystem type. This type of conversion process results in great delays and possibly errors when accessing certain file objects. For example, if a directory having a large number of files is opened for reading, the open process is suspended until that entire directory is converted to the new filesystem type. Thus, the user will see degraded performance each time a filesystem object needing to be converted is first encountered. Secondly, this process logic does not ensure that all file objects within a filesystem are converted. Only those that are touched will be converted. Therefore, the operating system must continue to support both types of filesystem structures even if one type is less efficient than the other.

Thus, there is an unmet need for a filesystem structure and operating system that permits the filesystem type to be converted while the filesystem remains active so that operations and access to the filesystem are not interrupted.

SUMMARY OF THE INVENTION

Accordingly embodiments of the present invention relate to a filesystem conversion process that does not require shutting down a filesystem to perform the conversion, ensures all objects within the filesystem are converted, and, from the perspective of a user, does not impact the performance and operation of the file system.

One aspect of the present invention relates to a method for converting a filesystem from a first type to a second type. In accordance with this aspect, a conversion process is executed to convert each directory of the first type in the filesystem into the second type while maintaining the file system in an active state, and then the conversion process is terminated when every directory of the first type in the filesystem has been converted to the second type.

Another aspect of the present invention relates to another method for converting a filesystem from a first type to a second type. In accordance with this aspect, a list is created of directories of the first type in the filesystem to convert; and then each directory in the list is converted to the second type while maintaining the filesystem in an active state.

BRIEF DESCRIPTION OF THE DRAWINGS

FIG. 4 depicts a more detailed flowchart of an exemplary method to run the conversion process of FIG. 3.

FIG. 5 depicts an exemplary algorithm to build a list of directories in a filesystem to convert according to an embodiment of the present invention.

FIG. 6A depicts another exemplary filesystem.

FIG. 6B depicts a list of directories from the filesystem of FIG. 6A as generated by the exemplary algorithm of FIG. 5.

FIG. 8 depicts a detailed flowchart of an exemplary method to activate a new directory during conversion of a file system.

FIGS. 9A-9F depict a series of snapshots of an exemplary filesystem as it is being converted according to the algorithms of FIGS. 7 and 8.

DETAILED DESCRIPTION

As mentioned above, the embodiments discussed hereinafter utilize a filesystem conversion process or software application that supports automatically converting a filesystem from one type to another while the filesystem remains operating. A specific implementation of such a conversion process capable of supporting this functionality in a manner consistent with the invention will be discussed in greater detail below. However, prior to a discussion of such a specific implementation, a brief discussion will be provided regarding an exemplary hardware and software environment within which such an process may reside.

Figure 1:
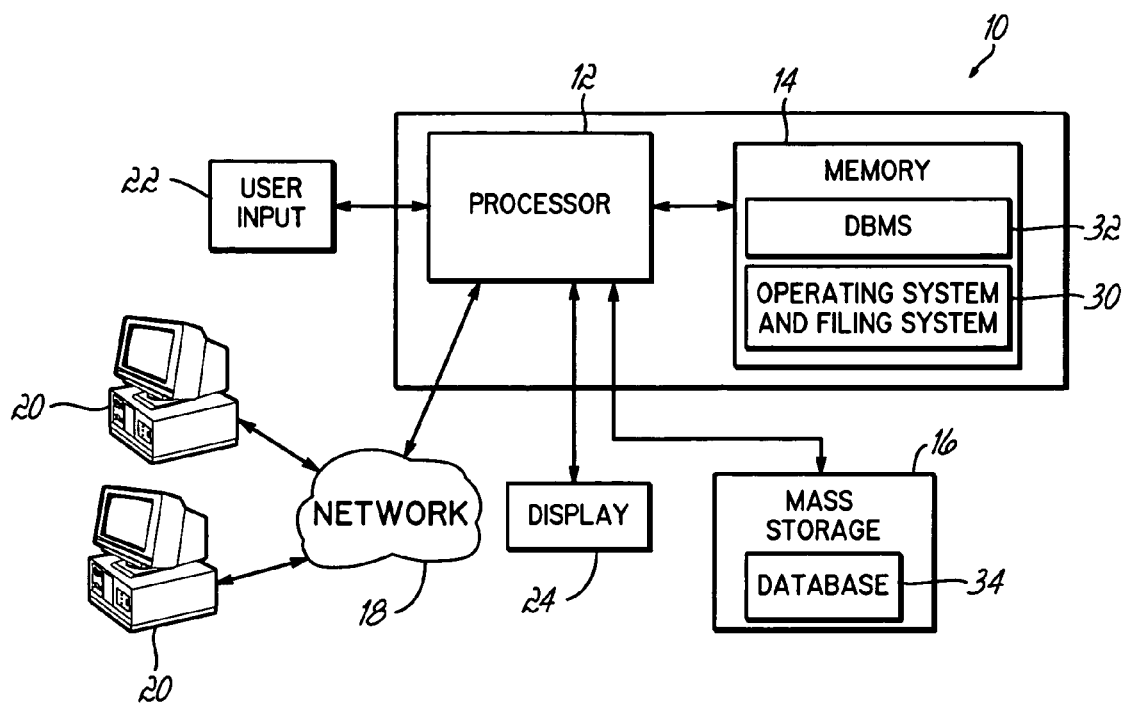
FIG. 1 illustrates an exemplary computer system on which embodiments of the present invention may be implemented.

Turning now to the Drawings, wherein like numbers denote like parts throughout the several views, FIG. 1 illustrates an exemplary hardware and software environment for an apparatus 10 suitable for implementing a filesystem conversion process consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network. Part of the operating system 30 is an implementation of a filesystem type that defines how data is stored and arranged across the physical storage media of the system. The operating system 30 is considered to run over, or on-top of, the filesystem and utilizes knowledge about this implementation to properly access data within the filesystem. The filesystem data refers to the data which the operating system 30 may access, while the filesystem type refers to a specification of how and where the data is stored and arranged. As discussed in more detail below, embodiments of the present invention relate to a process for changing from one filesystem implementation type to another.

Other hardware components may be incorporated into system 10, as may other software applications. In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has been and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
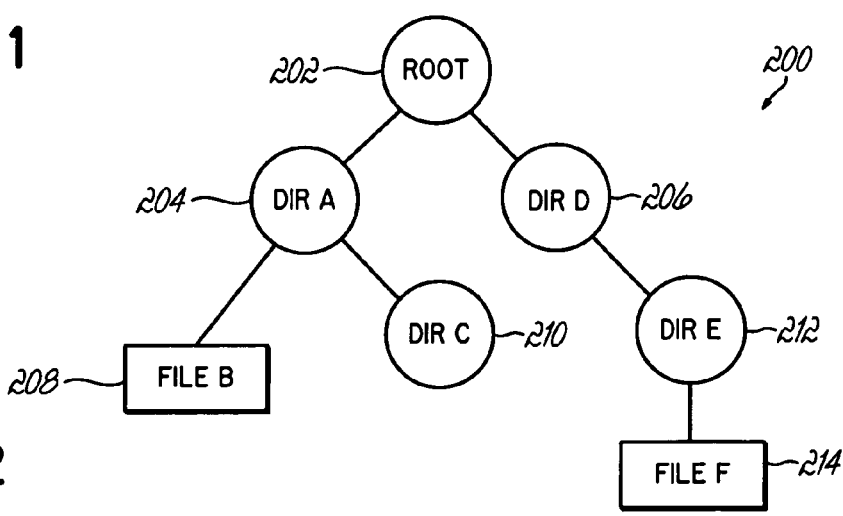
FIG. 2 depicts an exemplary filesystem structure as a tree diagram.

FIG. 2 depicts an exemplary filesystem tree 200 for a computer such as that in FIG. 1. The files and objects of this exemplary filesystem are represented in a hierarchical manner. The top of the tree 200 is the root directory 202 that has two children directories, DirA 204 and DirD 206. DirA 204 includes two child objects, a FileB 208 and a child directory DirC 210. On the other hand, DirD 206 includes one immediate child object, DirE 212, which itself includes a child object, FileF 214. According to an embodiment of the present invention, the filesystem advantageously implements each directory (202, 204, 206, 210 and 212) as a list of immediate child objects and an anchor location. Thus, a directory includes information about what its child objects are and a respective pointer to each location. One of ordinary skill will recognize that other object attributes my be included as well, such as file-modification times, security attributes, etc. For example, if the child object is itself a directory, one attribute that may be present could relate to the location or name of its parent directory; such an attribute would not necessarily be stored if the child object is a non-directory object such as a file.

In FIG. 2 as well as the later drawings of filesystem tree structures, the directory labels and file labels are often depicted as being on or in the object itself. This convention is useful for keeping the figures from appearing cluttered and for clearly indicating what object is associated with which label. However, a more appropriate convention would be to place each label next to the link (or the line) between a parent object and a child object in the tree. In other words, the root directory 202 of FIG. 2 does not actually contain DirA 204 and DirD 206; instead, the root directory 202 contains a link to DirA and another link to DirD. Thus, as described herein, when DirA or DirC is "renamed", this means that the appropriate link in their respective parent directories is renamed; not the name of the object itself.

The filesystem type specifies what information is stored for a filesystem object (e.g., a file, a directory), how that information is formatted, and how that information is arranged; this information is often referred to as metadata. During normal operation of the computer system, the operating system and applications work together to invoke processes and routines that are aware of the underlying filesystem type and available metadata in order to properly create, delete, open and modify objects within the filesystem. Changing from one filesystem type to another filesystem type involves changing the metadata (or its internal structure) that accompanies each object within the filesystem. As mentioned earlier, there are conventional methods, which all require shutting down access to the filesystem during conversion, that convert from one filesystem type to another. Thus, the description below of converting from one filesystem type to another does not focus on the actual mechanics of translating metadata; but, instead, describes in detail how to translate metadata while maintaining the filesystem in full operational capacity. One such example, however, of metadata conversion contemplated by the present invention involves changing directory entries from a generic database structure to a specialized directory object.

In accordance with the above-mentioned example, an operating system in which a directory entry is a generic database record will likely process filesystem operations using general database accessing and processing logic. This logic will necessarily be general in nature to equally handle the directory entries encountered by the operating system as well as other non-filesystem objects encountered by the operating system. A different filesystem type, however, may implement a directory entry as a specialized object that is appropriately formatted and arranged for reliable and efficient processing. The operating system will include specialized logic for processing the specialized directory entry while also maintaining generic database processing logic to handle less-specialized objects encountered during operation. Thus, the specialized directory object may be designed for efficiency, reliability, security, accessibility, etc.

Figure 3:
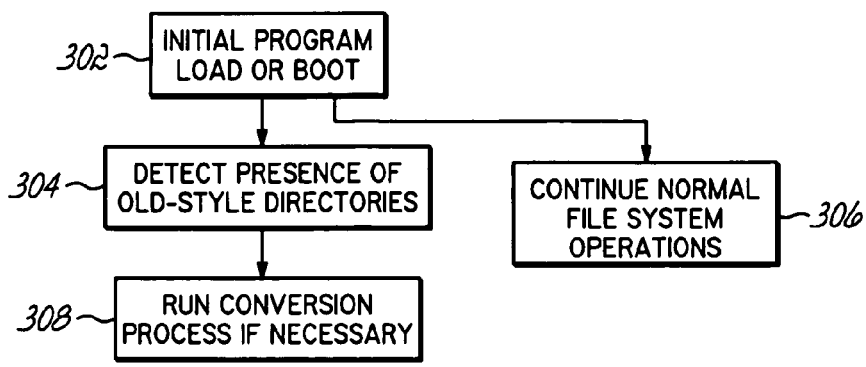
FIG. 3 depicts a flowchart of an exemplary algorithm for converting a filesystem while the filesystem remains active, in accordance with the principles of the present invention.

Turning to FIG. 3, a flowchart is depicted of an exemplary algorithm for converting a filesystem from one type to another while the filesystem continues to be operating and available for users. According to the particular flowchart of FIG. 3, the system automatically changes the file system from an old-style to a new-style without explicitly receiving verification from a user that the conversion process should be started. One of ordinary skill will recognize that an optional step may be included in the flowchart of FIG. 3 that permits the user to control, or manually effect, whether the conversion process is activated or not.

In step 302, a computer system undergoes an initial program load or re-boot. Such an operation is usually necessary after a new version of an operating system is installed or loaded. As part of the initial program load, or as a subsequent step, a process is started, in step 304, that detects whether the filesystem includes objects of an old filesystem type. Most current systems in the field upgrading an operating system version will have old-style directories and objects within the filesystem. However, a new, factory installation of an operating system may by default only have created objects of the new filesystem type. Also, if the computer system suffered a crash, particularly before the conversion process could complete, then the algorithm of FIG. 3 would automatically re-start the conversion routine from a point sometime before the crash occurred once the system is re-booted.

Concurrently with the detecting, in step 304, of old-style filesystem objects, the operating system maintains, in step 306, the availability and operation of the filesystem as would be normally provided. While the filesystem is operational and available, a conversion process is initiated, in step 308, to convert the filesystem from an old-type, or old-style, to a new-type, or new-style. The terms "old" and "new" are intended as generic descriptors to distinguish one type from another, and as used herein, do not necessarily restrict a filesystem conversion from always converting from an older filesystem type to a newer filesystem type. Embodiments of the conversion process described herein may also return an operating system from a more recent filesystem type to an older type.

By running the filesystem conversion process while also maintaining the availability of the filesystem, the need to shutdown the filesystem to a quiescent state is avoided. Thus, a user can continue to access and utilize a filesystem even while the filesystem conversion is taking place. Conventional multi-tasking operating systems include a mechanism for setting the priority of a process relative to other processes that may be concurrently executing. Accordingly, the priority of the process for converting a filesystem may be set to a low priority so as not to noticeably affect the performance of the operating system or the priority may be set higher if some potential performance degradation is acceptable to a user. In an exemplary embodiment, the conversion process runs as a single thread at the lowest possible priority. Alternative embodiments of the present invention may dynamically change the priority of executing the conversion process based on a system-level or file-level activity of the system. For example, if a particular directory of the filesystem is being used more than some predetermined level, then the conversion process may operate at a lower priority or even skip the busy filesystem object until its activity level decreases. Thus, the usage rate of a filesystem object may be utilized to determine whether or not to postpone converting that object until some later time. The conversion process may also determine that after a directory is converted that it might be beneficial to convert it back to its original style. This determination may be based on performance issues, data-integrity issues, or the like. Similarly, certain system activities may be considered as incompatible with a filesystem conversion, such as activities that access and/or create a number of new files. While such activities could easily be allowed to concurrently execute without modifying the algorithm of FIG. 3, it may be beneficial to stop the filesystem conversion while such processes are active. An exemplary process would be the installation of a new software application or the saving or restoring of data for backup and archive purposes. Thus, embodiments of the present invention contemplate stopping the filesystem conversion process while either of these types of other processes are executing.

A more detailed view of the conversion process 308 from FIG. 3 is provided in FIG. 4. More particularly, FIG. 4 depicts a flowchart of an exemplary method for implementing a filesystem conversion process that will operate concurrently with normal filesystem and operating system activity. Referring to the flowchart of FIG. 4, the conversion process begins by building, in step 402, a list of any old-style directories that are present in the filesystem. Once the list is built, then the process steps through the list and converts, in step 404, each entry from an old-style directory to a new-style directory and activates, in step 406, the new-style directory. As part of activating the new-style directories, the conversion process may also clean-up old-style links to filesystem objects and delete old-style directories. The steps 404 and 406 are repeated for each entry in the list of old-style directories.

FIG. 5 depicts an exemplary algorithm for building a list of old-style directories. This exemplary algorithm creates the list in a non-recursive manner that minimizes the amount of time a directory is held open for reading and minimizes the amount of memory as compared to that often consumed by a recursive process. However, it is understood that alternative but equivalent scanning methods of the filesystem, including recursive processes, may also be used to build the list of old-style directories.

According to FIG. 5, the list is started by initially adding, in step 502, the root directory. In step 504, the list of old-style directories is accessed and the next entry in the list is read and identified. The root directory is the only directory in the list when the list is first read in step 504 and, thus, in step 506, the immediate, old-style child directories of the root directory are identified. In subsequent performances of step 504, the next entry in the list is read and its old-style child directories are identified in step 506. If no entries are left in the list when step 504 is performed, then the process can end in step 508. Also, if no old-style child directories are identified in step 506, then the processing of that particular entry is complete and the logic flow returns to step 504 to retrieve the next entry in the list. If, however, an old-style child directory is identified in step 506, then it and its similar siblings are added to the list, in step 510. The process then repeats by returning to step 504 where the next entry in the list is read to determine if additional entries will need to be added to the list. Thus, the exemplary algorithm of FIG. 5 non-recursively walks through the filesystem tree and builds a list of all old-style directories that will be converted to new-style directories during the filesystem conversion process.

The exemplary filesystem tree 600 of FIG. 6A provides an opportunity to describe the operation of the algorithm of FIG. 5 along with the old-style directory list that would be built. For purposes of FIGS. 6A and 6B, all directories are assumed to be old-style directories. Walking through the algorithm of FIG. 5, the root directory 602 is added to the top of the list and then when the root directory 602 is read, its child directories DirA 604 and DirB 606 are added to the list. Processing continues by reading the next entry in the list and when DirA 604 is read, its child directory DirC 608 is added to the list. Because DirC 608 is the only child directory of DirA 604, DirB 606 is read next from the list resulting in DirD 610 and DirE 612 being added to the list. DirC 608 is then read from the list but has no child directories. Processing moves on to identifying DirF 614 as the only child of DirD 610 and adding it to the list. DirE 612 is then read from the list but has no child directories. DirF 614 is then read from the list but has no child directories. The resulting directory list 650 is shown in FIG. 6B.

Figure 7:
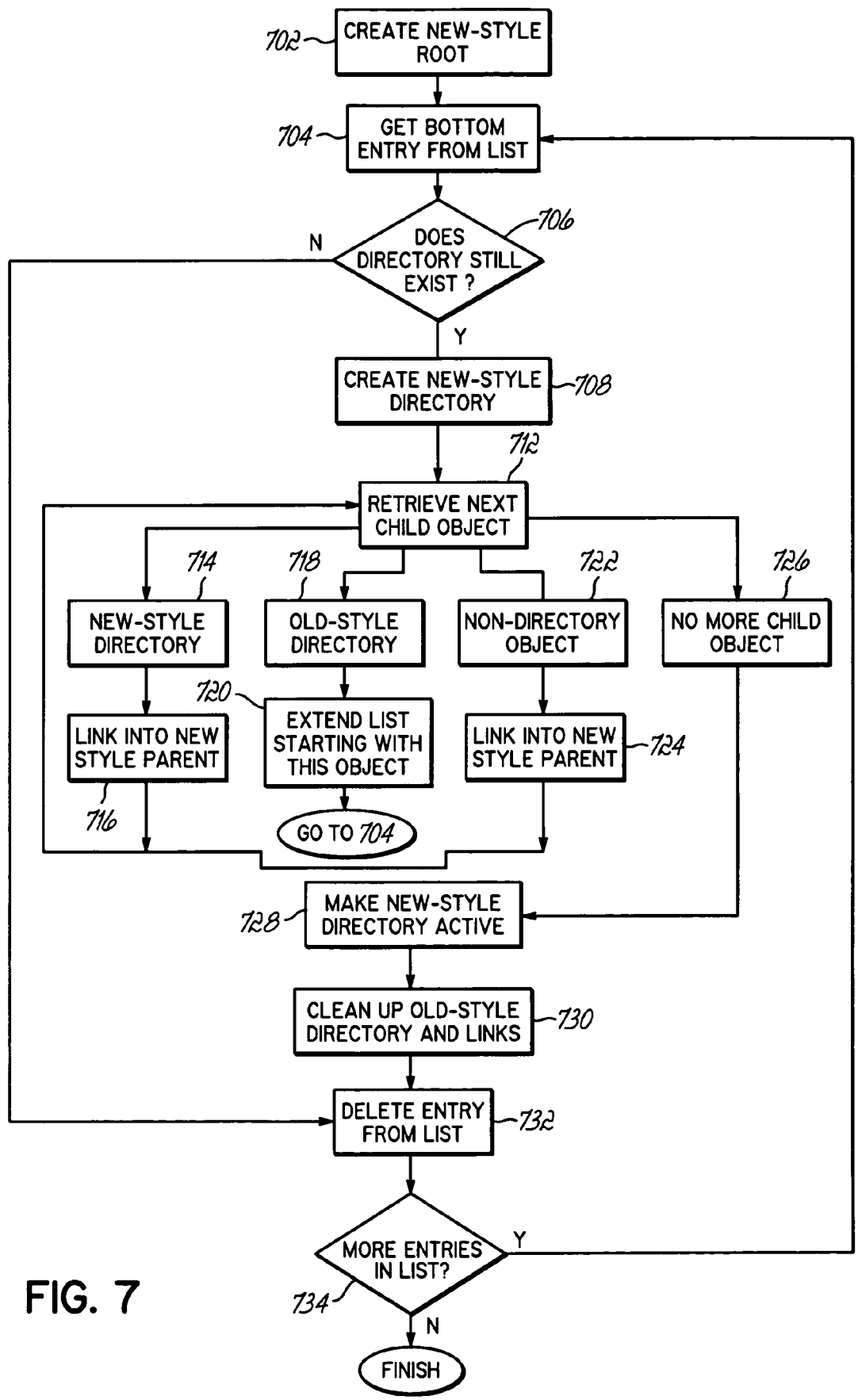
FIG. 7 depicts a flowchart of an exemplary embodiment of the present invention for converting a filesystem from one type to another.

FIG. 7 depicts a flowchart of an exemplary algorithm for converting each old-style directory identified in a filesystem (e.g., the list 650 of FIG. 6B) to a new-style directory while the filesystem remains fully operational and accessible. Because the filesystem remains active during the conversion process, the new operating system that supports the new filesystem type will also include support for the old filesystem type. Thus, old-style filesystem objects may be accessed, and even deleted, by applications that are executing. However, in order to keep from adding additional old-style filesystem objects to the filesystem during the conversion process, the operating system advantageously creates any new object in the new-style filesystem implementation. However, one of ordinary skill will recognize that alternative methods that do create old-style filesystem objects may be employed such as maintaining a journal of old-style objects as they are created for later conversion.

In step 702, a new-style root directory is created as an object in the filesystem, this directory is initially empty. This new-style root directory will temporarily serve as the parent directory for newly created new-style directories and will eventually be the root directory when the filesystem is completely converted to the new type. If the conversion process was previously interrupted, such as by a system crash, then when it is restarted, the new-style root directory will already exist and step 702 may be skipped. In an alternative implementation, the new-style root directory is used during the conversion process but then discarded. A different new-style root directory is then created that corresponds to the old-style root directory when that old-style root directory is eventually converted.

In step 704, the last directory entry from the list of old-style directories is retrieved for processing. Because the filesystem is active, this directory may have been deleted or moved and, thus, may no longer exist. In step 706, therefore, a check is made to determine if the directory still exists. If not, then the entry is deleted and the new bottom entry from the list is retrieved for processing.

Assuming that the old-style directory does exist however, then, in step 708, a new-style directory is created in the filesystem that corresponds to an old-style directory. This new-style directory is initially empty and will need to be populated with a link to each of the child objects that are in the old-style directory. Thus, in step 712, the old-style directory is read in order to retrieve its child objects. Child objects may be directories (714, 718) or files 722. Also, because the filesystem is active, a child directory may be either a new-style directory 714 or an old-style directory 718. A new-style directory would arise from previous conversion steps or from directories created during the conversion process. An old-style directory would arise from an operation that resulted in moving an existing old-style directory as a child into the current old-style directory being processed.

The format of the exemplary directory list 650 in FIG. 6B advantageously arranges the directories in the filesystem 600 from the root directory 602 downwards to the leaf nodes of the filesystem. Accordingly, if the filesystem is converted by beginning from the bottom of the list 650 and moving upwards, then all the children directories of a parent directory are converted before the parent is converted. This order of converting files in conjunction with setting certain characteristics about a directory provides the benefit of being assured that no directories were added to a directory during the filesystem conversion process without being able to be detected.

Because the filesystem is active and operating, the possibility exists that a old-style directory was moved into an old-style parent directory after the list 650 is built but before the parent directory is actually converted. In normal filesystem operations, when a directory, or other object, is added to a parent directory, the parent directory locates an available entry and adds a link or reference to that new object. As objects are often deleted from a directory, the first available entry space may not always be at the end of the directory but instead exist in the middle of the directory structure. Some filesystems include an attribute within a directory that forces new entries to be added to the end of the directory. Embodiments of the present invention utilize this attribute, or can implement it as an additional feature, so that any new entries into a directory that is being converted are added to the end of that directory. Thus, in step 708, before each old-style directory is read, the directory is flagged so that any new entries to that directory are appended at the end instead of using intermediate free space.

If during the conversion process, an old-style directory is encountered within a parent directory, then such an occurrence can only occur if the old-style directory was moved into the parent directory after the list 650 had been built. Upon such an occurrence, the conversion process may return to the list building routine of FIG. 5 and add the newly detected directory at the end of the list. Returning to the conversion process will re-start the conversion process with the newly added entry and allow the conversion process to continue.

Thus, when an old-style directory 718 is encountered as a child object in step 712, this child object is returned to the list building routine 402 of FIG. 5 as the last entry in the list (block 720). The routine 402 will then perform steps 506 and 510 as usual to determine if any additional child directories are to be added to the list. Once the list is complete, then the conversion process of FIG. 7 may be restarted. The new bottom entry of the list is retrieved in step 704 and the filesystem conversion process continues as before.

When a new-style directory 714 is encountered, then, in step 716, its link is renamed into the new-style directory created in step 708. If a non-directory object 722 such as a file is encountered, then it is linked, in step 724, into the new-style parent directory created in step 708. The processing of child objects continues until it is determined in step 726 that no more child objects exist in the current directory.

At this point, the new-style directory has a link to each of the child objects that existed in the old-style parent directory being converted. Thus, in step 728, the old-style directory is deactivated and the new-style directory is made active. In step 730, a clean-up process is executed to remove any links or filesystem objects (such as the old-style directory) that are no longer used in the new-style filesystem. The list of old-style directories is then updated, in step 732, by deleting the current bottom entry that just completed being converted. If more entries exist in the list, then step 734 returns logic flow to step 704 to get the next bottom entry in the list. Otherwise, the conversion process is finished.

As just described, the directories of the old-style filesystem are converted from the outermost leaf nodes upwards to the root directory. Accordingly, the root directory is the last directory converted. As explained, this exemplary method of converting the directories permits the detection of old-style directories that may have been introduced after the list of old-style directories was built. One of ordinary skill would recognize, that alternative methods may be used that accomplish this same functionality. For example, the filesystem may be converted from the top down and include scanning logic that scans through the filesystem to detect if during the conversion process files were added or moved that need to be converted. Such scanning logic may be used at intermediate nodes within the filesystem or as a final step once all the directories have purportedly been converted.

A more detailed look at the activation from the old-style directory to the new-style directory, as performed in step 728, is shown in FIG. 8. This flowchart illustrates an exemplary algorithm for activating the new-style directory. This exemplary algorithm assumes that the filesystem and operating system work with structures similar to vnodes. A vnode-like structure is a temporary data structure created by the operating system that references an open, or active filesystem object. Typically, when a process first opens a filesystem object, the vnode identifier is returned to the process. Applications or system processes that need to access a filesystem object refer to the vnode using this identifier which, in turn, refers to the filesystem object itself. There is only one vnode for a filesystem object regardless how many applications have it in-use; therefore, typically, the vnode includes an attribute that is a count of the number of processes that are using the vnode. Because the filesystem is active during the conversion process, an old-style directory about to be de-activated may be in-use by a number of different processes in addition to the conversion process. Using a new vnode for the new-style directory and deleting the vnode for the old-style directory will have a detrimental affect on any process that is using that filesystem object. Thus, exemplary embodiments of the directory activation process will advantageously change the old-style directory's vnode to refer to the new-style directory object identifiers in such a way that processes (which have the old-style directory open) will seamlessly be switched from the old-style directory to the new-style directory without knowing that the switch has been made.

Turning to the algorithm of FIG. 8 then, in step 802, the filesystem is locked from changing the vnode of the old-style filesystem object. By asserting a lock on the old-style filesystem object, the conversion process prevents the vnode from being changed during the activation/de-activation process. In step 804, a rename is performed that removes the temporary link to the new-style directory, removes the link to the old-style directory, and adds the permanent link to the new-style directory. This makes the new-style directory active and visible to applications.

Next, in step 806, the vnode is updated to point to the new-style filesystem object. Thus, the vnode number stays the same but the vnode is modified to reference a different filesystem object (i.e., the new-style filesystem object). Other attributes of the vnode may be changed as well; for example, the directory size in the vnode will likely be different. Also, the "type" of filesystem object may be changed in the vnode to reflect that the vnode now references a new-style object instead of an old-style object. Once this change occurs, any operating processes that had the old-style filesystem object open will still use that vnode that now points to the new-style filesystem object.

Step 808 is an optional step that is performed when an old-style filesystem object is encountered that also is within a data structure known as a mount control block. A mount control block is another temporary data structure typically maintained by an operating system that contains information about a filesystem. For example, when the new-style directory being activated is the root directory, then step 808 will modify some of the information in the mount control block for that filesystem. Such modifications may include, for example, changing the pointer for the root directory to point to the new-style root directory identifier; changing a flag that indicates that the filesystem is entirely a new-style filesystem; and other attributes such as the maximum number of links permitted to an object in the filesystem. For example, as previously described, the operating system may support both types of filesystems and thus include logic that tests an object to determine which version of object handlers to use when accessing a particular filesystem object. Once a filesystem has been flagged as being entirely of the new type, then the operating system can omit support for the old-style filesystem. Once optional step 808 is completed, the lock may be released, in step 810, by the conversion process. At this point, the new-style directory entry is used and the conversion process continues as outlined in the algorithm of FIG. 7.

The series of figures from FIG. 9A-9F depict snapshots of a filesystem that is undergoing the conversion process according to the algorithm of FIG. 7. The filesystem 900 is complex enough to illustrate the different filesystem structures that may be encountered during conversion but is simple enough to allow for a brief description. Because many of the activities of the exemplary conversion process operate on the links of the filesystem 900, these links are labeled and numbered (unlike earlier figures) to permit distinguishing between the filesystem object and the link to the filesystem object.

The filesystem 900 includes a root directory 902 that has a link 904 labeled "A". The directory 905 pointed to by the link 904 includes two links—a link 906 to a file 907 and a link 908 pointing to a directory 909. Link 906 is labeled "B" and link 908 is labeled "C". The directory 909 includes a single link 910, labeled "D", that points to a file 911. FIG. 9A also depicts the filesystem 900 after the new-style root directory 912 has been created.

The list of old-style directories that was built for the filesystem 900 would have DirC 909 as its bottom entry so this would be the first directory converted. FIG. 9B illustrates the filesystem 900 after some of the steps of converting DirC 909 have been completed.

As an initial step, a new-style directory 920 is created in the filesystem 900. One assumption made using this exemplary algorithm is that any directory created will have a parent directory of the same type. Thus, the creation of the new-style directory is accomplished by creating a link 916 within the new-style root directory 912. The link 916 to the new-style directory 920 will have a system-wide unique name so that it is distinguishable from the other filesystem objects. When the DirC 909 is read, then it will return FileD 911 as its child object. Accordingly, a link 918 is created within the new-style directory 920 that refers to FileD 911. As an intermediate step, another link 914 is created, this time between DirA 905 and the new-style directory 920. The link 914 is labeled C' and is a temporary link that will allow a simple name swap to occur at a later step. One exemplary way to create link 914 is to create a link in DirA 905 that is also labeled "C" but use a different uniqifier such as "200". Such a naming convention will create two unique links within DirA 905 but the second link 914 will not be visible to user applications until the original link 908 to "C" is removed.

Figure 9C:
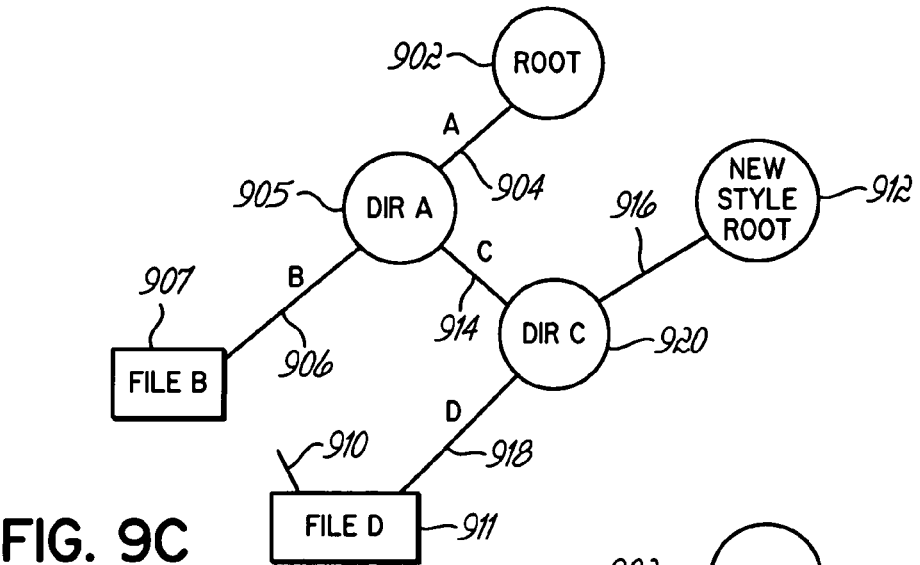

At this point, all the attributes of DirC 909 are mirrored to the new-style directory 920 in preparation for activating the new-style directory 920. FIG. 9C illustrates the filesystem 900 after the new-style directory 920 has been activated. To reach this stage, the link 914 is relabeled from C' to "C" within DirA 905. A side-effect of this is that the link 908 is removed. The object pointer within the vnode for DirC 909 is changed to point at the filesystem object 920—the new-style directory. The link 910 is no longer needed and may now be deleted. At this stage, a user accessing DirC will use the new-style directory 920 rather than the old-style directory 909 that may now be deleted.

Figure 9D:
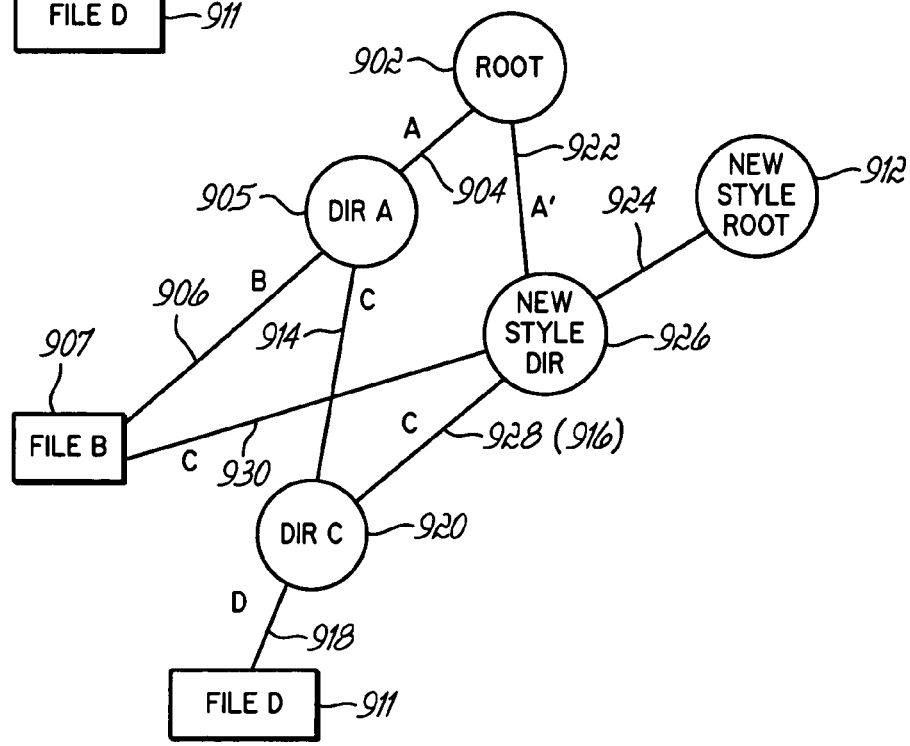

Once DirC 909 is converted, it is deleted and then it is deleted from the list of old-style directories and the next bottom entry on the list is converted. In the exemplary filesystem 900, the next directory is DirA 905. FIG. 9D shows the steps of converting DirA according to the algorithms of FIGS. 7 and 8. The initial step is to create a uniquely-named new-style directory 926 that is linked via link 924 to the new-style root directory 912.

DirA 905 is read and FileB 907 and DirC 920 are identified as child objects. Accordingly, a link 930 to FileB 907 is created in the new-style directory 926. DirC 920 is identified as a new-style directory so there exists a link 916 between DirC 920 and the new-style root 912. This link 916 is renamed to link 928 which now points from the new-style directory 926 to DirC 920. A link 922 is also added in the parent directory of DirA 905 that allows simple renaming to be performed later. Specifically, a link 922 labeled A' is created in the root directory 902. The new-style directory 926 is now ready to be activated.

Figure 9E:
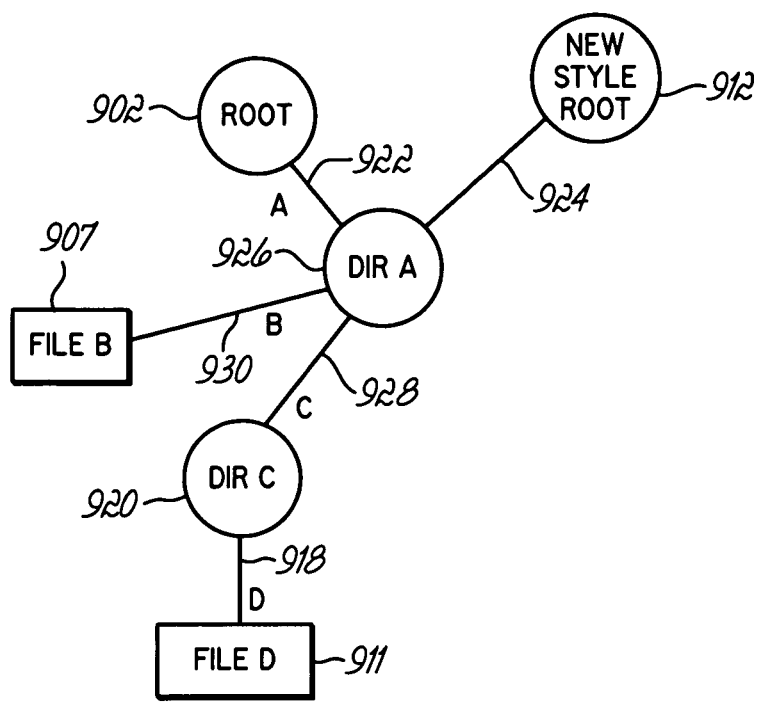

FIG. 9E shows the filesystem 900 after the new-style directory 926 is activated. In particular, all attributes from DirA 905 were transferred to the new-style directory 926 and the link 922 was renamed to "A". A side-effect of this is that link 904 is removed. The vnode of old-style directory 905 is changed to refer to the new-style directory 926 and is now active. Any remaining old-style files and links are deleted. The old-style root directory 902 is the remaining directory to be converted.

Figure 9F:
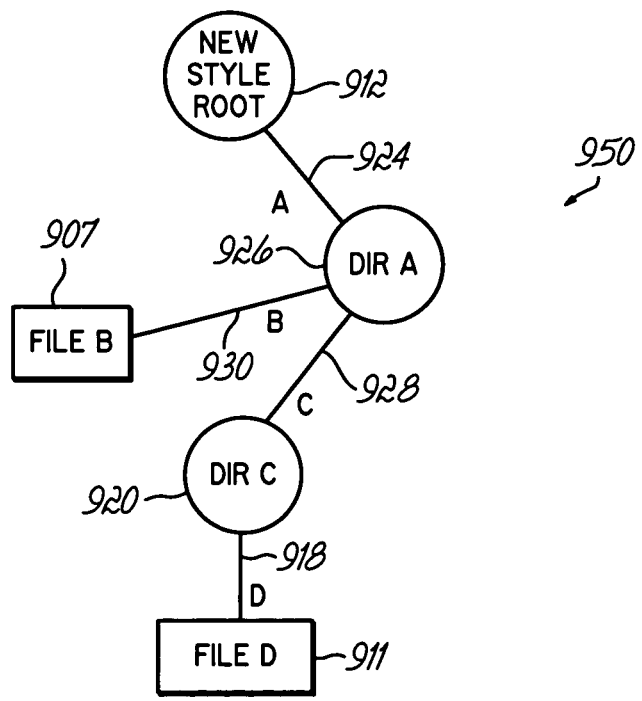

DirA 926 is identified as the sole child object of the old-style root 902. Because DirA 926 is a new-style directory, there already exists a link 924 between the new-style DirA 926 and the new-style root 912. Link 924 is renamed from its filesystem-wide unique name to "A". Accordingly, the link 922 from the old-style root 902 is destroyed. The vnode is changed to refer to the new-style root 912. The remaining step is to modify the mount control block to point to the new-style root 912 instead of the old-style-root. Thus, the converted filesystem 950 is depicted in FIG. 9F.

The exemplary algorithms depicted in the figures and described above do not explicitly include error checking routines so as not to obscure the inventive aspects of these algorithms. However, one of ordinary skill will recognize that at a variety of different stages, appropriate error checking may be performed to determine if system conditions warrant stopping a conversion process that is executing. For example, if a corrupted filesystem is encountered or an overflow of auxiliary storage occurs, then the conversion process may be stopped. When the system is once again restarted, the conversion process will once again be initiated (see FIG. 3) and restarted.

During the conversion process described above, there are times when it would be advantageous for the filesystem to support two, concurrent implementations of an object in both the new-style filesystem manner and the old-style filesystem manner. A filesystem and operating system is herein described that provides such support. However, the described processes and structures are not limited in application to a filesystem conversion application but provide a general solution for supporting multiple, different, simultaneous object implementations within a filesystem. To provide such support, a filesystem may need to address issues such as how to link the same file into two different directories having different filesystem implementations, and how to link a directory of one implementation into a parent directory having another implementation.

Referring back to the previous discussion of filesystems, a directory is considered to be a list of entries wherein each entry includes a name and a reference pointer. Other attributes are likely included in each entry as well, as would be understood by one of ordinary skill. The reference pointer in the directory entry points to a data structure maintained by the operating system. It is this data structure that describes the filesystem object and points to its storage location within a physical storage medium. This data structure is specified by the operating system and the filesystem and allows applications and processes to access the data of the filesystem.

The above-described arrangement of directories and other data structures is meant to be exemplary in nature and is not intended to limit the scope of the present invention to only filesystems and operating systems that identically match the above description. One of ordinary skill will readily recognize that different virtual file systems and filesystem structures are in practice and others will be developed in the future. Such filesystems may have fewer, or even more, levels of indirect referencing and may maintain different information in the equivalent data structures. Thus, in its broadest sense, embodiments of the present invention relate to organizing the data structure that describes a filesystem object in such a way that a filesystem can concurrently support objects having different filesystem implementations.

Figure 10:
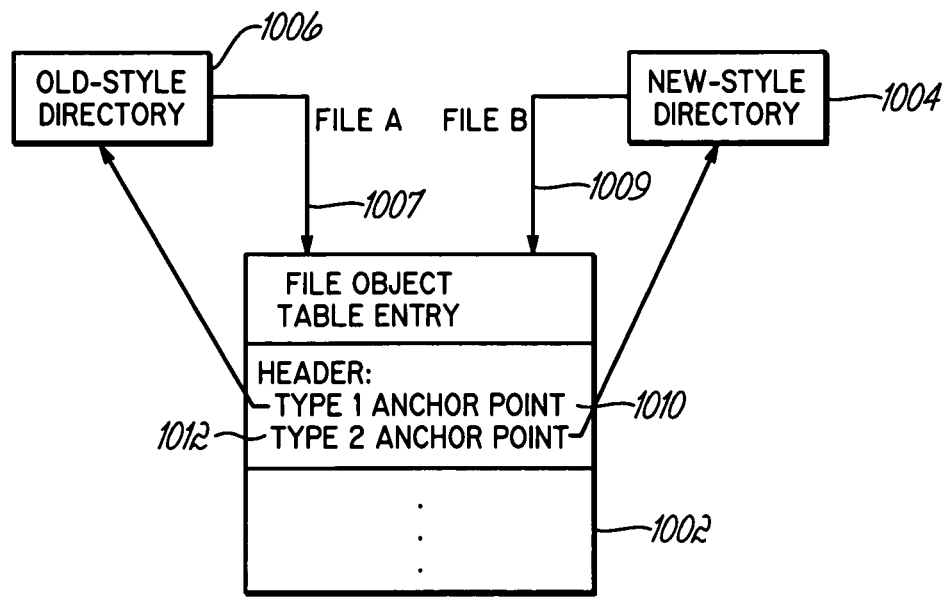
FIG. 10 depicts an exemplary data structure corresponding to a file object.

FIG. 10 illustrates an exemplary data structure 1002 for a file that includes a two different anchor points 1010, 1012. There are two different links 1007, 1009 to this data structure 1002. The first link 1007 is in an old-style directory 1006 and is labeled "FileA", the second link 1009 is in a new-style directory 1004 and is labeled "FileB". Both directories 1004, 1006 link to the same object because both links point to the same data structure 1002.

The data structure 1002 includes an anchor point for each different type of directory that references it. In the exemplary structure of FIG. 10, two different types of filesystems are assumed so two different types of anchor points 1010, 1012 are available for the data structure 1002; although, other numbers of available filesystem types may be available in alternative embodiments. These two types of anchor points are available for each data structure 1002 but may be NULL (or some other value) when no directory of the appropriate type references that data structure. The first anchor point 1010 points back to the old-style directory 1006 and the other anchor point 1012 points to the new style directory 1004. In this manner, the operating system is made aware that this file is referenced by two different filesystem implementations.

In use, the operating system may want to determine information about a link (e.g., 1007, 1009) for the file having the corresponding data structure 1002. In such instances, the operating system may want unique information depending on whether the information is to be used within the context of the new-style file system or the old-style filesystem. Accordingly, the operating system uses the anchor points 1010, 1012 to trace back to the appropriate link (e.g., 1007, 1009) in the appropriate style of directory.

Figure 11:
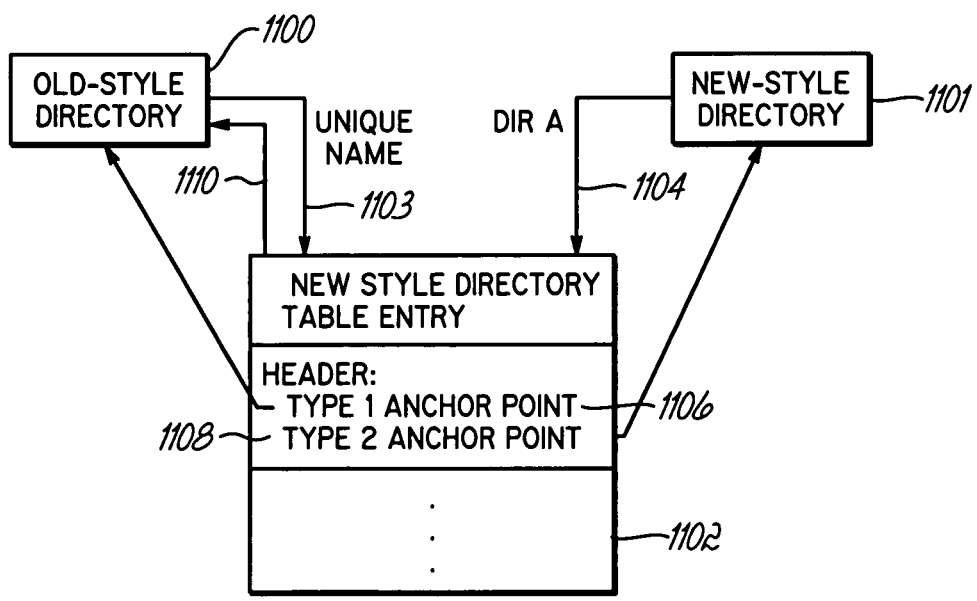
FIG. 11 depicts an exemplary data structure corresponding to a directory object.

In certain embodiments of the exemplary filesystem conversion process described above, one assumption was that a child directory is linked into a parent directory having the same type of filesystem implementation; thus, every directory includes an anchor point within a parent directory of the same filesystem type. In addition, there may be instances where the child directory is linked into other referencing directories that may be of a different filesystem implementation. The exemplary data structure 1102 of FIG. 11 illustrates a data structure for a new-style directory. This directory is referenced by two directories 1100, 1101 having different filesystem implementations. This data structure 1102 is a specific example of the more generic case where a directory is linked into different parent directories having different filesystem implementations. Thus, the description that follows may be modified accordingly to describe a data structure for an old-style directory that is linked into directories of both-styles of filesystem implementations, as well.

Similar to the file data structure 1002, the directory data structure 1102 includes two different anchor points 1106, 1108 that refer back to appropriate styles of directories. In many operating systems and filesystems, one way in which a link to a directory differs from that of a link to a file is that one of the attributes of the directory link is a "dot-dot" link. This attribute points to, or links to, the parent directory of a directory. According to the exemplary data structure 1102, the dot-dot link 1110 points to the same-style parent directory— new-style directory 1100. The link 1104 from the different style directory 1101 is similar to a file link in that it does not include the dot-dot link. Thus, the data-structure 1102 includes an anchor point 1106, 1008 for each filesystem implementation and is referred to by a file-like link 1104 from a referencing directory 1101 that is of a different implementation style. However the data structure is referred to by a directory-link 1103 from a referencing directory 1100 having the same style implementation.

In the above exemplary filesystem conversion process, a link to the child directory is sometimes created in a parent directory having a different type. For example, referring to FIG. 9C, the new-style directory 920 is created and includes a link to the new-style root 912 and the old-style DirA 905. Referring to this example in explaining the data structure 1102, the new-style directory 920 is linked into a parent directory 912 having the same implementation type. The name of the link 916 to directory 920 is unique to the filesystem. One way to create a unique name would be to name the new directory 920 after the file ID and possible generation ID of the old-style directory 909 that it is replacing. These IDs are unique across a file system and might result in the link 916 being labeled "21837F42". Because the new root directory 912 is not yet active, the link 916 is not visible to users and the operating system. However, the dot-dot link associated with directory DirC 920 points to the new-style root 912. There is also a link 914 in DirA 905 that references the new style directory 920. This link 914 is visible to end users but is similar to a file link in that there is no dot-dot information associated with this link 914. Thus, the link 914 and the link 916 are different structural entries in their respective directories 905 and 912. Within the data structure for the new-style directory 920, the anchor point to the new-style implementation refers back to the new-style root 912 and the anchor point to the old-style implementation refers back to DirA 905. The result is that a new-style directory is created that is visible from an old-style directory yet is concurrently implemented properly in a parent directory having the same filesystem implementation type.

Because the filesystem remains active in the exemplary filesystem conversion process described above, there are instances in which a link to a directory of one filesystem implementation may be created in a directory of a different implementation. Two particular instances in which this might arise is when a new-style directory is created in an old-style directory and when an old-style directory is moved into an already converted new-style directory. Utilizing the data structures described with respect to FIGS. 10 and 11, provide one exemplary method by which the file conversion process may implement the newly created directories in such a way that they may be referenced from both a directory of the same type and from a directory of a different type.

In the instance where a new-style directory is created in an old-style directory, the process of creating the new-style directory is the same as that just described with respect to the creation of the new directory 920 and will not be repeated. To re-iterate the end result, however, the new-style directory is linked from the old-style directory with a file-like link and also linked from a hidden root directory having the new-style filesystem implementation. The data structure representing the new-style directory includes information about both links as well as the parent directory.

When an old-style directory is moved into a new-style filesystem, a link is created in the new-style file system that references the old-style directory. Another link is created in the old-style root directory that references the moved directory. This link uses a unique name to refer to the moved directory. Also, this link is advantageously hidden from users and includes associated dot-dot information identifying the old-style root as the parent of the moved directory. Thus, the link in the new-style directory is a file-like link while the link in the old-style directory is a directory link having associated with it the appropriate dot-dot information.

Various modifications may be made to the illustrated embodiments without departing from the spirit and scope of the invention. Therefore, the invention lies in the claims hereinafter appended.

What is claimed is:

1. A method for converting a filesystem from a first filesystem type to a second filesystem type that is different from the first filesystem type, the method comprising the steps of:
   generating a list of directories of the first filesystem type in the filesystem to convert;
   converting each directory in the list to the second filesystem type while maintaining the filesystem in an active state, wherein converting each directory in the list includes converting such directory from a first structure compatible with a first filesystem type to a second structure compatible with a second filesystem type, wherein the step of converting further includes the steps of:
   a) creating a second-type root directory, wherein the second-type root directory has a structure that is compatible with the second filesystem type;
   b) creating a second-type directory corresponding to a particular directory in the list, wherein the particular directory has a structure that is compatible with the first filesystem type and the second-type directory has a structure that is compatible with the second filesystem type;
   c) generating a respective link in the second-type directory for each child object of the particular directory;
   d) activating the second-type directory; and
   e) removing the particular directory from the list; and
   creating a data structure associated with the second-type directory, the data structure including a first anchor point that is associated with a parent directory of the directory and a second anchor point associated with a parent directory of the second-type directory such that the data structure is concurrently linked to both the first and second filesystem types.

2. The method of claim 1, further comprising the step of:
   sequentially initiating the steps of generating and converting upon initial program load of a computer system utilizing the filesystem.

3. The method of claim 1, wherein the step of converting further includes the steps of:
   retrieving an identifier of a first directory in the list, wherein the first directory has a structure compatible with the first filesystem type;
   converting the first directory to a second directory, wherein the second directory has a structure compatible with the second filesystem type; and
   activating the second directory.

4. The method of claim 3, further comprising the step of:
   repeating the steps of claim 3 for each directory in the list.

5. The method according to claim 1 wherein the list represents a top-down view of the filesystem spanning from a root directory down to an outermost leaf-node.

6. The method according to claim 5, wherein the step of converting each directory is performed for each directory in an order opposite to that of the list.

7. The method according to claim 1, wherein the step of generating further includes the steps of:
   a) adding a root directory as a current entry in the list;
   b) identifying a child directory of the current entry in the list;
   c) appending the identified child directory to the list;
   d) repeating steps b) and c) for each child directory within the current entry;
   e) changing a next directory in the list immediately following the current entry to be the current entry, if the next directory exists in the list; and
   f) repeating steps b)-e) until no next directory exists in the list.

8. The method of claim 1, further comprising the step of:

marking a particular directory as being in the process of conversion once the particular directory is in the list.

9. The method of claim 8, wherein a new object added to the particular directory is appended at an end of the particular directory.

10. The method of claim 1, further comprising the steps of:
detecting a condition for pausing the converting step; and
in response to the condition, pausing the converting step.

11. The method of claim 10, wherein the condition is one of:
a product install on the filesystem; a restore operation involving the filesystem; and a back-up operation involving the filesystem.

12. The method of claim 1, further comprising the steps of:
determining a usage rate of a particular directory before converting that directory; and
postponing converting the particular directory based on the usage rate.

13. The method of claim 1, further comprising the steps of:
detecting a condition for stopping the converting step; and
in response to the condition, stopping the converting step.

14. The method of claim 13, wherein the condition is one of:
a system crash, encountering a corrupted object within the filesystem, and insufficient available storage.

15. The method of claim 13, wherein the converting step is restarted upon a subsequent initial program load involving the filesystem.

16. The method of claim 3, wherein the step of activating further includes the steps of:
identifying a data structure associated with the directory;
changing the data structure to be associated with the second-type directory; and
removing the directory.

17. The method of claim 16, further comprising the step of:
asserting a lock on first data structure while performing the step of changing.

18. A program product, comprising:
a program code configured upon execution to convert a filesystem from a first filesystem type to a second filesystem type that is different from the first filesystem type by:
generating a list of directories of the first filesystem type in the filesystem to convert; and
converting each directory in the list to the second filesystem type while maintaining the filesystem in an active state, wherein converting each directory in the list includes converting such directory from a first structure compatible with a first filesystem type to a second structure compatible with a second filesystem type, wherein the step of converting further includes the steps of:
a) creating a second-type directory corresponding to a particular directory in the list, wherein the particular directory has a structure that is compatible with the first filesystem type and the second-type directory has a structure that is compatible with the second filesystem type;
b) retrieving each child object of the particular directory;
c) for each retrieved child object of the particular directory that is a directory having a structure that is compatible with the second filesystem type or that is a file, generating a respective link in the second-type directory therefor; and
d) for each retrieved child object of the particular directory that is a directory having a structure that is compatible with the first filesystem type, adding the directory having the structure that is compatible with the first filesystem type to the list; and
a non-transitory computer readable medium storing the program code.

19. An apparatus comprising:
at least one processor;
a memory coupled with the at least one processor; and
a program code residing in memory and executed by the at least one processor, the program code configured to convert a filesystem from a first filesystem type to a second filesystem type that is different from the first filesystem type by:
initiating a conversion process to convert a structure of each directory of the first filesystem type in the filesystem into another structure of the second filesystem type while maintaining the filesystem in an active state; and
terminating the conversion process when the respective structure of every directory of the first filesystem type in the filesystem has been converted to the respective other structure of the second filesystem type;
wherein the program code is further configured to:
for a particular directory being converted, determine if the particular directory is being used more than a predetermined amount;
postpone converting that particular directory while it is being used more than the predetermined amount;
convert another directory, different than the particular directory, while the particular directory is being used more than the predetermined amount;
for a particular directory being converted, maintain a first version having the first filesystem type and a second version having the second filesystem type; and
activate the second version while de-activating the first version.

20. The apparatus of claim 19, wherein the program code is further configured to:
non-recursively build a list of directories of the first filesystem type.

21. The apparatus of claim 19, wherein the program code is further configured to:
modify a particular directory being converted such that any new entries in that particular directory are appended at an end of that particular directory.

22. The apparatus of claim 19, wherein the program code is further configured to:
pause the conversion process if a predetermined operation is detected as being performed on the filesystem.

23. The apparatus of claim 19, wherein the program code is further configured to:
stop the conversion process at a particular point when an abnormal system condition is detected; and
restart the conversion process at the particular point.

24. The apparatus of claim 19, wherein the program code is further configured to:
for a particular directory already converted, convert the particular directory back to the first filesystem type.

25. The apparatus of claim 19, wherein the program code is further configured to:
execute at an adjustable priority level that is dynamically adjusted based on system activity.

26. A method for converting a filesystem from a first filesystem type to a second filesystem type that is different from the first filesystem type, the method comprising the steps of:
generating a list of directories of the first filesystem type in the filesystem to convert; and converting each directory in the list to the second filesystem type while maintaining the filesystem in an active state, wherein converting each directory in the list includes converting such directory from a first structure compatible with a first filesystem type to a second structure compatible with a second filesystem type;

wherein the list represents a top-down view of the filesystem spanning from a root directory down to an outermost leaf-node, and wherein the step of converting each directory is performed for each directory in an order opposite to that of the list.

27. The method of claim 1, wherein activating the second-type directory includes:

locking a vnode data structure associated with the particular directory, wherein a process accesses the particular directory using the vnode data structure;

updating the locked vnode data structure to refer to the second-type directory; and unlocking the vnode data structure, wherein when the process attempts to access the particular directory using the vnode data structure after the vnode data structure is updated, the process accesses the second-type.

28. The method of claim 1, wherein the step of converting further includes creating a temporary link to the second-type directory in a parent directory of the particular directory, wherein the parent directory includes a link to the particular directory, and wherein the temporary link is not visible from user applications until the link to the particular directory is removed from the parent directory.

\* \* \* \* \*